United States Patent
Suurkuusk

(10) Patent No.: US 11,340,122 B2
(45) Date of Patent: May 24, 2022

(54) CALORIMETRIC PROBE AND A METHOD FOR CALORIMETRIC MEASUREMENT

(71) Applicant: Soojus AB, Järfälla (SE)

(72) Inventor: Jaak Suurkuusk, Järfälla (SE)

(73) Assignee: SOOJUS AB, Järfälla (SE)

( * ) Notice: Subject to any disclaimer, the term of this patent is extended or adjusted under 35 U.S.C. 154(b) by 315 days.

(21) Appl. No.: 16/485,875

(22) PCT Filed: Feb. 20, 2017

(86) PCT No.: PCT/EP2017/053814
§ 371 (c)(1),
(2) Date: Aug. 14, 2019

(87) PCT Pub. No.: WO2018/149513
PCT Pub. Date: Aug. 23, 2018

(65) Prior Publication Data
US 2020/0003632 A1  Jan. 2, 2020

(51) Int. Cl.
*G01K 17/10* (2006.01)
(52) U.S. Cl.
CPC .................................. *G01K 17/10* (2013.01)
(58) Field of Classification Search
None
See application file for complete search history.

(56) References Cited

U.S. PATENT DOCUMENTS

| 3,740,194 A | 6/1973 | Hendy |
| 4,054,056 A | 10/1977 | Wegstedt |

| 2008/0052032 A1* | 2/2008 | Danley | G01N 25/18 |
| | | | 702/130 |
| 2008/0247441 A1* | 10/2008 | Salvetti | G01N 25/4806 |
| | | | 374/33 |
| 2013/0121369 A1* | 5/2013 | Thoen | G01K 17/04 |
| | | | 374/31 |

FOREIGN PATENT DOCUMENTS

FR  2294437 A1  7/1976

OTHER PUBLICATIONS

PCT International Search Report issued in corresponding PCT Application No. PCT/EP2017/053814, dated Oct. 19, 2017, pp. 1-2.
PCT International Preliminary Report on Patentability issued in corresponding PCT Application No. PCT/EP2017/053814, dated May 31, 2019, pp. 1-25.

* cited by examiner

*Primary Examiner* — Erica S Lin
(74) *Attorney, Agent, or Firm* — Murtha Cullina LLP

(57) ABSTRACT

A reaction calorimeter probe having an inner tube having a pumpable reaction medium flowing therethrough, and an outer tube extending coaxially of the inner tube, a sealed space between the inner and outer tube, a first temperature sensor at an inlet end of the inner tube, a second temperature sensor at an outlet end of the inner tube, at a distance from the first temperature sensor, the first and second temperature sensors are in the space and in contact with the outer surface of the inner tube for measuring an absolute temperature of the inner tube, the first and second temperature sensors enable determinations of absolute temperatures, and a calculation device connected with the first and second temperature sensors, the calculation device to determine a first absolute temperature, a second absolute temperature and to determine a temperature difference between the first and second absolute temperatures.

12 Claims, 4 Drawing Sheets

CALORIMETRIC PROBE AND A METHOD FOR CALORIMETRIC MEASUREMENT

FIELD OF THE INVENTION

The present invention relates to the field of calorimetric probes, and more particularly to a reaction calorimeter probe arranged for calorimetric measurements in a pumpable reaction medium, and a method of continuous determination of the heat production in a reactor containing a pumpable reaction medium.

BACKGROUND OF THE INVENTION

Reaction calorimetry is a field that commonly is associated with thermal investigations of chemical processes being applicable within the process industry. Reaction calorimeters are typically designed as batch reactors of 0.1-2 liters, with the aim that they should simulate a full scale chemical process. Some examples of existing commercial instruments are RC1 and HFCal (by Mettler-Toledo), Atlas and Chemisens (by Syrris, previous Chemisens AB), and Simular (by HEL-Group).

SE7415590 discloses an in-situ reaction calorimeter probe having an inner tube through which a fluid to be measured flows, an intermediate coaxial tubular part, which has either a thick wall or a thin wall, and first and second temperature sensors arranged at an inlet end and an outlet end, respectively, of the inner tube. Furthermore, the probe comprises an outer part enclosing the intermediate part. The intermediate part defines a sealed first space around the inner tube, which space is filled with air at atmosphere pressure. The outer part defines a second space between the outer part and the intermediate part. Each one of the temperature sensors is arranged in physical contact with both an outer surface of the inner tube and an inner surface of the intermediate part. Each sensor determines the temperature difference between the outer part and the inner tube with a time delay that corresponds to the time it takes for the fluid to flow from the first temperature sensor to the second temperature sensor. Finally, the temperature difference between the temperatures determined by the first and second temperature sensors is determined, and this final temperature difference is used for determining the heat production in the fluid during the passage through the inner tube. The aim with this known reaction calorimeter probe is good, but it is far from reached due to several drawbacks of the construction. A primary problem is that external temperature fluctuations affect the measurements in an arbitrary way that is not possible to compensate with any of the methods suggested in SE7415590. It is often very small amounts of reaction generated heat that are to be detected, which raises very high demands on extreme precision and resolution of the measurements. In these environments and under these conditions, the air that is used in the spaces has a heat conductivity far too high and affects the absolute temperatures of the inner tube and the intermediate tube, on which the temperature measurements are performed. Different portions of the same part also have different temperatures due to external influences. Therefore, it is not possible to achieve reliable results.

SUMMARY OF THE INVENTION

It would be advantageous to enhance the accuracy and reliability of the measurements.

To better address this concern, in a first aspect of the invention there is presented a reaction calorimeter probe arranged for calorimetric measurements in a pumpable reaction medium, comprising an inner tube arranged to have the pumpable reaction medium moving through the inner tube, an outer tube extending coaxially of the inner tube at a radial distance from the inner tube, a sealed space between the inner tube and the outer tube, wherein the space is provided with a vacuum, a first temperature sensor arranged at an inlet end of the inner tube, a second temperature sensor arranged at an outlet end of the inner tube, at a distance from the first temperature sensor, wherein the first and second temperature sensors are arranged in the space and in contact with the outer surface of the inner tube for measuring an absolute temperature of the inner tube, wherein the first and second temperature sensors are arranged to enable determinations of absolute temperatures with a resolution which is better than 1 µK, and a calculation device connected with the first and second temperature sensors, which calculation device is arranged to determine a first absolute temperature by means of the first temperature sensor, a second absolute temperature by means of the second temperature sensor, and to determine a temperature difference between the first and second absolute temperatures. Furthermore, the reaction calorimeter probe comprises a first initiation thermometer arranged in the space and in contact with the outer surface of the inner tube adjacent to the first temperature sensor, and a second initiation thermometer arranged in the space and in contact with the outer surface of the inner tube adjacent to the second temperature sensor, wherein the first and second initiation thermometers are arranged to provide the respective first and second temperature sensors with initiation temperatures. Due to the combination of the inner tube being isolated by vacuum from the surroundings and the temperature sensors arranged on the inner tube, merely sensing the absolute temperature of the inner tube, and having an extremely high resolution, it is actually possible to perform determinations of the heat production at levels of accuracy and resolution good enough to enable true and reliable determination of the often very small amounts of heat produced by the medium during the passage through the inner tube.

For the purposes of this application, it should be mentioned that by the expression "pumpable reaction medium" any kind of medium used in a reactor and which can be pumped, i.e. forced in a desired direction, is included, i.e. gaseous media as well as liquid media of different viscosities.

In accordance with an embodiment of the reaction calorimeter probe, it comprises a pulse heater arranged in the space and in contact with the outer surface of the inner tube and arranged at the inlet end, closer to the very end than the first temperature sensor. The pulse heater is advantageously used for determining the flow rate of the medium through the inner tube. As an alternative a further pulse heater can be included with a mirrored mounting, i.e. at the second temperature sensor, thereby to make it possible to direct the flow through the inner tube one way or the other.

In accordance with an embodiment of the reaction calorimeter tube, it comprises a calibration heater arranged in the space and in contact with the outer surface of the inner tube between the first and second temperature sensors. The calibration heater is advantageously used for determining the heat capacity of the medium.

In accordance with an embodiment of the reaction calorimeter tube, the calculation device comprises an amplifier, which is alternatingly connected with the first and the second temperature sensors, respectively. By thereby using the same amplifier for amplifying the output signals from both temperature sensors, any drift or offset voltages of the output signal from the amplifier is eliminated since the temperature difference between the first and second temperature sensors is determined.

In accordance with an embodiment of the reaction calorimeter tube, the pressure in the space is lower than $10^{-8}$ bar. At this low pressure the drop of thermal conductivity is significant, which provides a particularly good isolation of the inner tube, which is only influenced by temperature fluctuations of the external medium at the very ends of the inner tube, which influence is negligible.

In accordance with an aspect of the invention, there is provided a method of continuous determination of the heat production in a reactor containing a pumpable reaction medium, by means of a reaction calorimeter probe as described above. The method comprises:

provide the first and second temperature sensors with initiation temperatures by means of the first and second initiation thermometers;
determining a first absolute temperature by means of the first temperature sensor;
determining a second absolute temperature by means of the second temperature sensor;
determining a temperature difference between the first and second absolute temperatures; and
determining the heat production by means of the temperature difference, the volume of the pumpable reaction medium in the inner tube between the first and second temperature sensors, and the heat capacity of the pumpable reaction medium. The method provides similar advantages as the reaction calorimeter probe.

In accordance with an embodiment of the method, the second absolute temperature is determined with a delay relative to the determination of the first absolute temperature, where the delay corresponds with the time it takes for the pumpable reaction medium to move from the first temperature sensor to the second temperature sensor. The expression "the time it takes for the pumpable reaction medium to move from the first temperature sensor to the second temperature sensor" means that if a particular molecule of the medium is observed when it passes the first temperature sensor it can be observed again at the second temperature sensor after said time. An advantage with this embodiment is that the temperatures of the same volume of the medium is measured at both sensors, and any change is due to heat generating chemical processes in the medium, not due to different temperatures of the medium when entering the inner tube.

In accordance with an embodiment of the method, the first and second absolute temperatures are determined simultaneously, and the method further comprises:

integrating a consecutive series of determined temperature differences over a predetermined time interval. When making simultaneous temperature determinations, external influences can have an impact. However, that influence is suppressed by the integration to a negligible level.

In accordance with an embodiment of the method, it further comprises:

performing a time delay determination by generating a heat pulse at the first temperature sensor, thereby inducing a significant local temperature change in the pumpable reaction medium; and
detecting the heat pulse at the second absolute temperature sensor.

In accordance with an embodiment of the method, it further comprises determining the heat capacity of the pumpable reaction medium, wherein the heat capacity determination comprises:

generating a predetermined flow rate of the pumpable reaction medium; and
during a determination time period constantly heating the pumpable reaction medium with a predetermined calibration heat between the first and second temperature sensors.

BRIEF DESCRIPTION OF THE DRAWINGS

The invention will now be described in more detail and with reference to the appended drawings in which.

DESCRIPTION OF EMBODIMENTS

Figure 1:
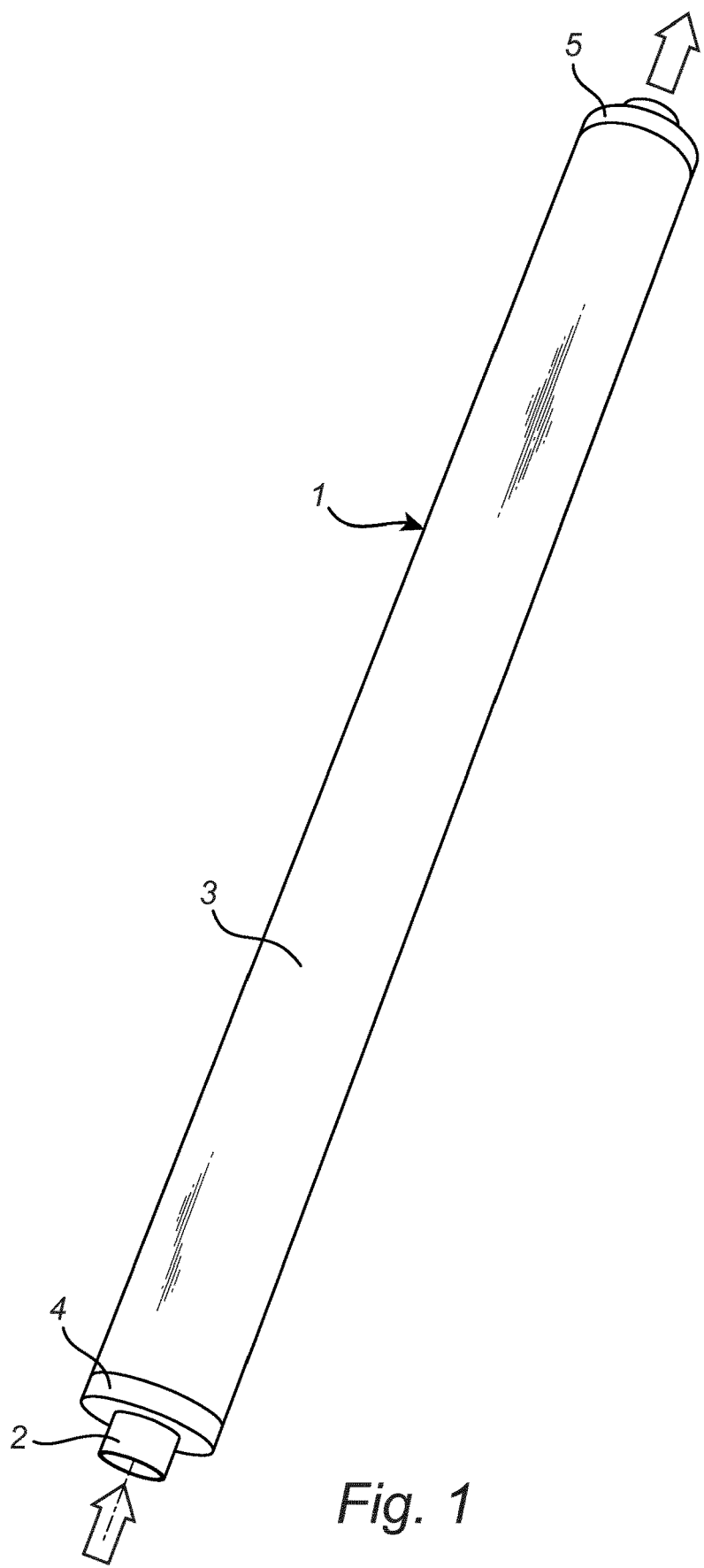
FIGS. 1-3 show different views of an embodiment of the reactor calorimeter probe according to the present invention.
Figure 2:
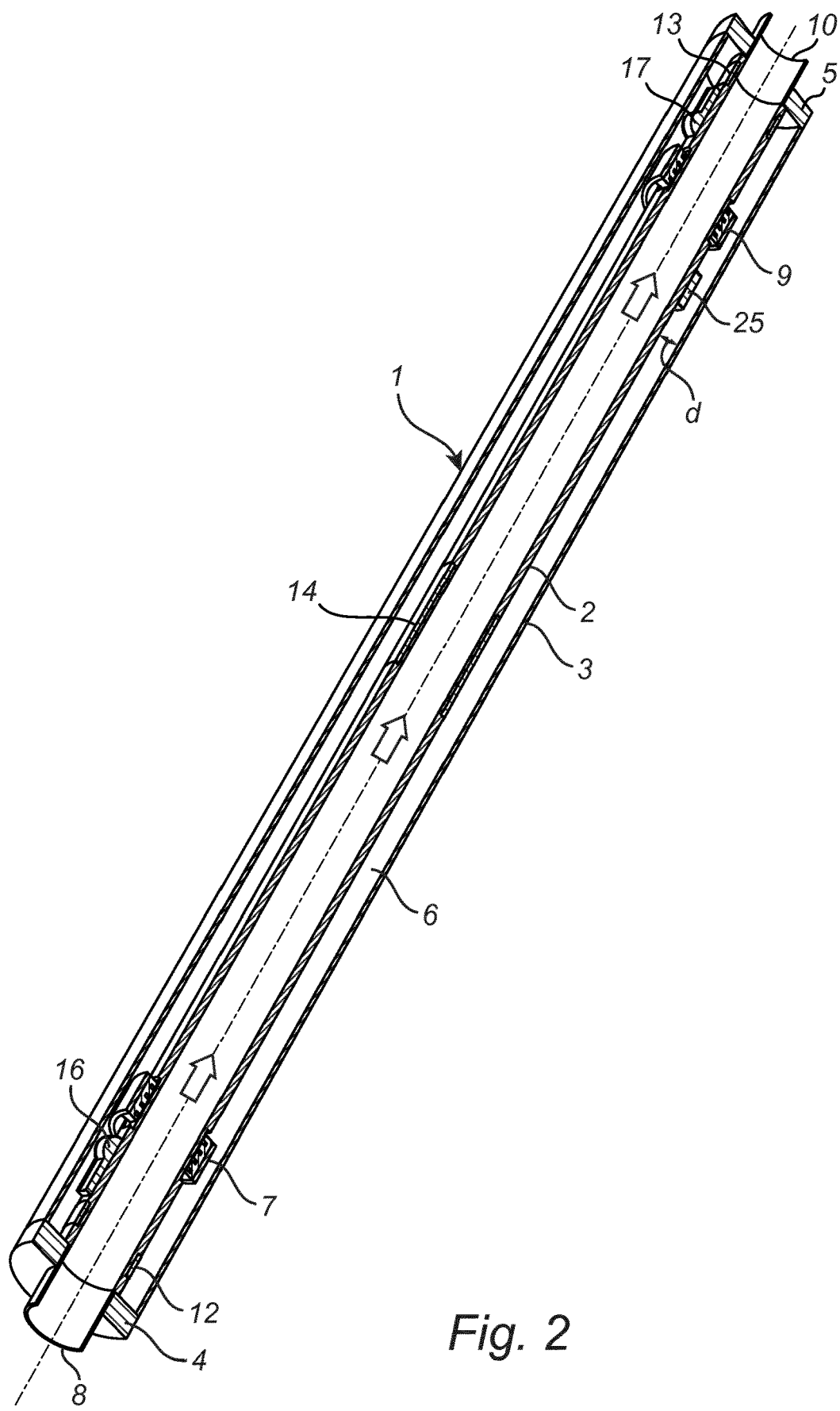
Figure 3:
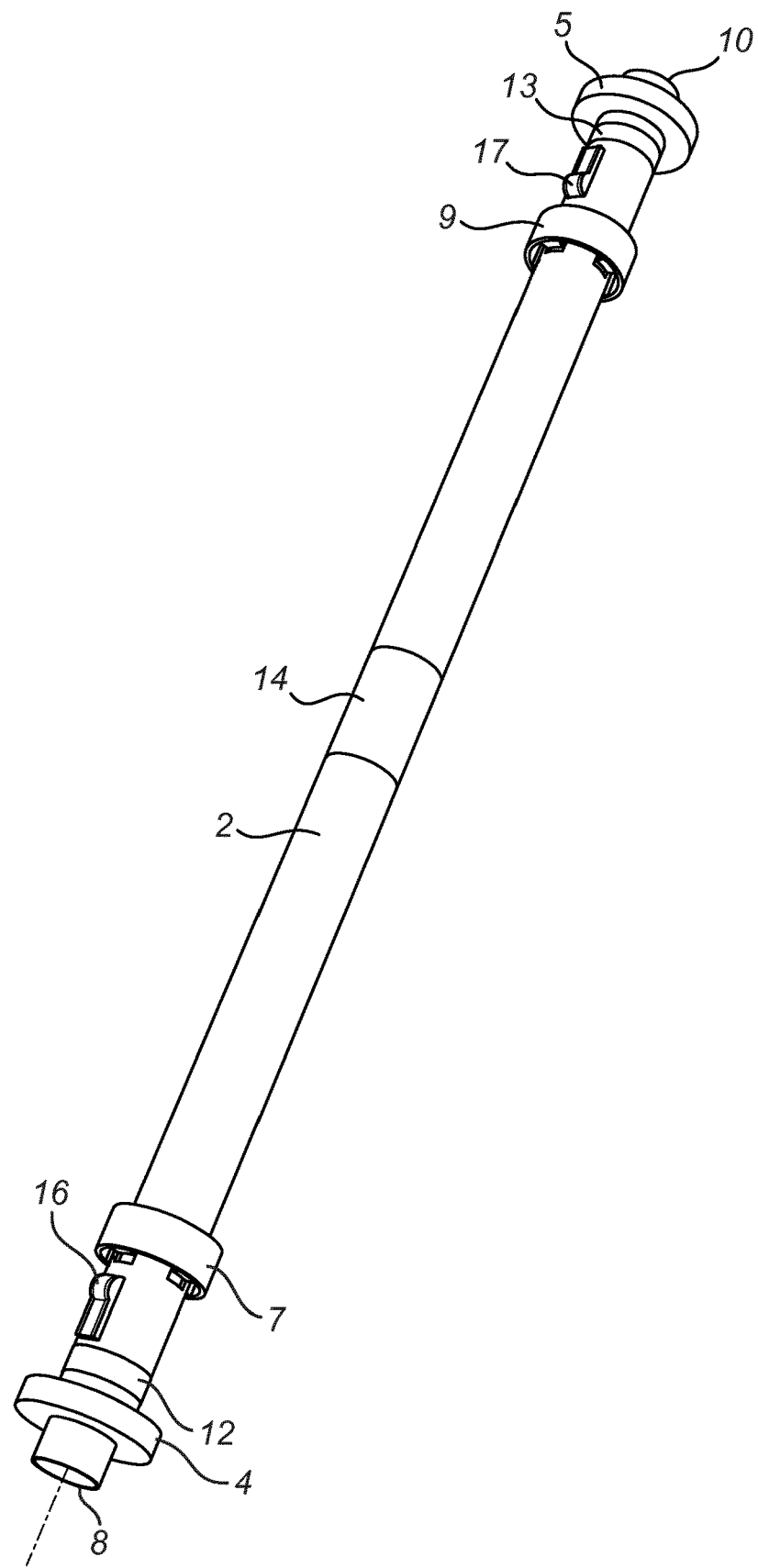
Figure 4:
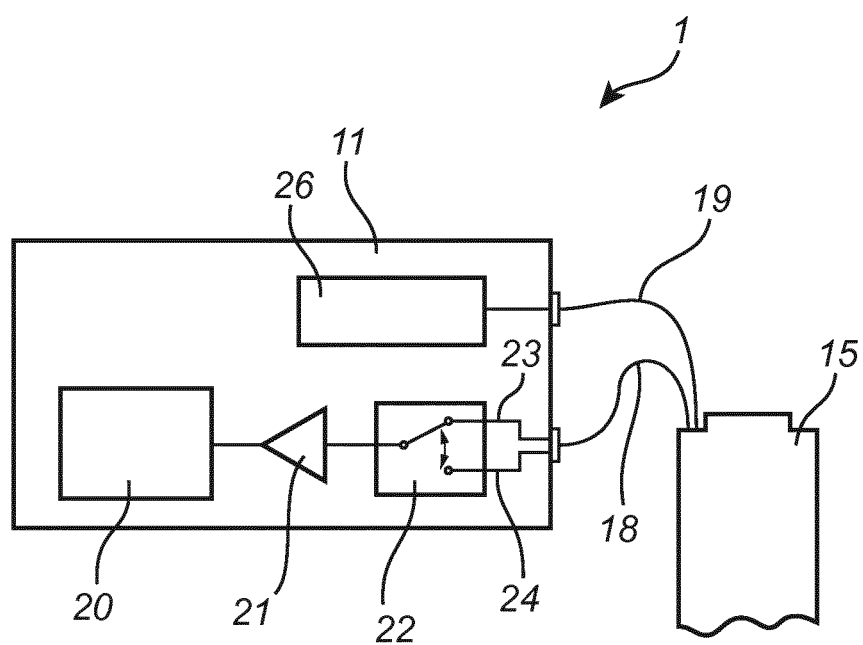
FIG. 4 is a block diagram of electronic equipment included in the reactor calorimeter probe.

A first embodiment of the reaction calorimeter probe 1 generally comprises an inner tube 2 arranged to have a pumpable reaction medium flowing through the inner tube 2, as for instance shown by the arrows in FIG. 1, and an outer tube 3 extending coaxially of the inner tube 2 at a radial distance d from the inner tube 2. The end openings of the outer tube 3 have been sealed by sealing first and second lids 4, 5. Thereby a sealed space 6 has been provided between the inner tube 2 and the outer tube 3. This structure of the inner and outer tubes and other parts therein, which will be described below, will herein also be referred to as a tubular part 15 of the reaction calorimeter probe 1. The space 6 is provided with a vacuum, i.e. the space 6 has been evacuated to a very low pressure, preferably below $10^{-6}$ bar, and more preferably below $10^{-8}$ bar. In any case, the evacuation of air should be made to a pressure level where the thermal conductivity within the space 6 is significantly reduced compared to that of air at atmosphere pressure, the latter being about 1 bar.

Furthermore, the reaction calorimeter probe 1 comprises a first temperature sensor 7 arranged at an inlet end 8 of the inner tube 2, and a second temperature sensor 9 arranged at an outlet end 10 of the inner tube 2, at a distance from the first temperature sensor 7, wherein the first and second temperature sensors 7, 9 are arranged in the space 6 and in contact with the outer surface of the inner tube 2 for measuring absolute temperatures of the inner tube 2. That is, the first temperature sensor 7 is arranged to measure a first absolute temperature at the inlet end 8 of the inner tube 2, and the second temperature sensor 9 is arranged to measure a second absolute temperature of the inner tube 2, at its outlet end 10. The first and second temperature sensors 7, 9 are arranged to measure absolute temperatures with a resolution which is better than 1 µK. Any kind of absolute temperature sensor which is capable of measuring temperatures at that level of resolution is usable. In order to give an example reference is made to the patent publication WO87/07372, which discloses a device for determining an absolute temperature. That device actually employs a measurement of a relative temperature between a measuring body and a reference body, whose thermal capacity is known, and which is arranged such that the heat transmission coefficient between the measuring body and the reference body is known or can be determined. The absolute temperature is determined by measuring the relative temperature between the measuring body and the reference body, and calculating the absolute temperature according to a particular equation described in WO87/07372, i.e. the following equation:

$$T_A = T_A^0 + \left[\int_0^t V(t)dt + \frac{c}{p}(V(t) - V(0))\right]\frac{p}{c \cdot g} \qquad \text{Eqn. 1}$$

where $T_A^0$ is the absolute temperature of the measuring body at the time 0, $V(t)$ is a physical parameter mathematically related to the measured temperature difference between the reference body and the measurement body, c is the thermal capacity of the reference body, p is the heat transmission coefficient, and g is a function indicating the mathematical relation between $V(t)$ and the temperature difference.

The reactor calorimeter probe 1 further comprises a calculation device 11, which is connected with the first and second temperature sensors 7, 9, which calculation device 11 is arranged to, at least, determine a temperature difference between first and second absolute temperatures, and determine the heat production by means of that temperature difference.

The reactor calorimeter probe 1 is used for in-situ measurement of the heat production in a reactor. Thus, in use, the reactor calorimeter probe 1 has been arranged in the medium within a housing of the reactor (not shown as such). In other words, the reactor calorimeter probe 1 is used for continuous determination of heat production within a system, such as a process reactor, a laboratory reactor, a fermenter, and the like, handling a pumpable reaction medium. The heat production determination is performed by continuously pumping the pumpable reaction medium through the inner tube 2. Due to the construction and operation of the reactor calorimeter probe 1, the heat production determination is independent of temperature fluctuations in the pumpable reaction medium that enters the inner tube 2. The reactor calorimeter probe according to this embodiment is about 100 times more sensitive than the most sensitive probes available on the market.

Furthermore, the reactor calorimeter probe 1 comprises a first pulse heater 12 arranged in the space 6 and in contact with the outer surface of the inner tube 2, and arranged at the inlet end 8 closer to the very end 8 than the first temperature sensor 7. Thus, the first pulse heater 12 is arranged between the first end 8 of the inner tube 2 and the first temperature sensor 7. A second pulse heater 13 is correspondingly arranged with a mirrored mounting, i.e. it is mounted at the second end 10 of the inner tube 2 between the second temperature sensor 9 and the very end 10. The first pulse heater 12 is used for determining the flow rate through the inner tube 2 of the medium, when the first end 8 is used as an inlet. The second pulse heater 13 is similarly used when the flow of medium is driven in the opposite direction, i.e. when the second end is employed as an inlet. Further, a calibration heater 14 is arranged in the space 6 and in contact with the outer surface of the inner tube 2 between the first and second temperature sensors 7, 9. The calibration heater is arranged to be employed for determining the heat capacity of the medium. In this embodiment, the calibration heater 14 comprises a resistance wiring, which is wound around the inner tube 2.

In this embodiment of the reaction calorimeter probe 1, the above-mentioned technology disclosed in WO87/07372 is employed. Therefore, the first and second temperature sensors 7, 9 are designed as relative temperature sensors, which employs the inner tube 2 as the measurement body and includes the reference body, which is attached to the inner tube 2 as shown in the figures, and generates an output signal corresponding to the relative temperature measured between the measurement body and the reference body. The calculation device 11 is arranged to calculate the first and second absolute temperatures by means of the formula with the relative temperatures as input.

The calculation device 11 is arranged externally of the tubular part 15. First and second electric cables 18, 19 extend externally from the space 6 to the calculation device 11 via sealed through holes of one of the lids 4, 5. The calculation device 11 comprises, inter alia, a temperature difference calculator 20, an amplifier 21 connected to the difference calculator 20, and a switch 22, which is connected to the amplifier 21. The first electric cable 18, in turn, comprises first and second sensor cables 23, 24, one from each temperature sensor 7, 9, which first and second sensor cables 23, 24 are connected to a respective one of two inputs to the switch 22. Thus, by toggling the switch 22, the amplifier 21 is alternatingly connected with the first and the second temperature sensors 7, 9, respectively. When the switch 22 is connected with the first sensor cable 23, the difference calculator 20 is arranged to determine the first absolute temperature, by means of said formula, and when the switch is connected to the second sensor cable 24, the difference calculator 20 is arranged to determine the second absolute temperature, by means of said formula. Having thus determined the first and second absolute temperatures, the difference calculator 20 is arranged to determine the difference between them.

Using this kind of relative temperature measurement as a basic information for determining the first and second absolute temperatures, at the inlet end 8, and at the outlet end 10, respectively, it is possible to determine the temperatures of the medium at the inlet and at the outlet with a resolution that is better than 1 µK, and even better than 0.5 µK. With first and second temperature sensors 7, 9 having a such a resolution it is possible to performing determinations of the reaction heat with a resolution of 100 µW/litre. The amplifier 21 used according to this embodiment is a nanovolt amplifier. Any offset voltages or drift of the amplifier 21 could detrimentally affect the measurement over time. For example, an offset drift of 1 nV can cause a temperature error of more than 0.1 mK during 24 hours. By amplifying the output voltage signals from the first and second temperature sensors 7, 9 by means of the same amplifier 21, the influence of these kinds of errors has been eliminated.

The above schematically described hardware structure is useful for any kind of temperature sensors, such as those directly generating an absolute temperature, generating a voltage signal as output, while the software of the difference calculator 20 will have to be adapted for different temperature sensors.

Furthermore, the reaction calorimeter probe 1 comprises a first initiation thermometer 16 arranged in the space 6 and in contact with the outer surface of the inner tube 2 adjacent to the first temperature sensor 7, and a second initiation thermometer 17 arranged in the space 6 and in contact with the outer surface of the inner tube 2 adjacent to the second temperature sensor 9. The first and second initiation thermometers 16, 17 are arranged to provide the respective first and second temperature sensors 7, 9 with an initiation temperature, i.e. an absolute temperature to use as an initial value of the above-mentioned formula for determining the absolute temperature. Preferably the first and second initiation thermometers 16, 17 are Platinum thermometers, which have a resolution of about 0.1 mK. Additionally, the initiation thermometers 16, 17 are used for calibrating the first and second temperature sensors 7, 9 before the first use, and thereafter whenever necessary, but usually rather seldom such as once a year.

The reaction calorimeter probe1 additionally comprises a pressure monitor 25, arranged in the space 6, for monitoring the vacuum by means of a determination of the heat conductivity within the space 6. The pressure monitor 25 generates a signal that is fed via the second electrical cable 19 to further circuit 26, included in the calculation device 11, for determining, inter alia, the pressure in the space 6.

Typical application areas for the reaction calorimeter 1 are, for example:

Process security. Used as a direct process monitor, dangerous situations can be quickly identified and necessary cooling, throttling of the reactant, etc. can be performed to avoid accidents.

Process monitoring. Direct measurement of reaction rates as a parameter of a feedback system for optimizing the outcome of the reaction.

Process optimization.

Reaction kinetics. Investigations of reaction rates and reaction mechanisms in environments identical or near identical to those of full scale processes.

General process monitor. To discover unexpected phenomenon, such as sudden changes of reaction rates due to traces of contaminents having a catalytic effect.

Biotechnology. Thermodynamic, kinetic, and phenomenological investigations of biotechnical processes, such as fermentation.

Chemical technology within the academy. A general tool for research and development within chemical technology.

The pumpable reaction medium can be moved through the inner tube 2 in different ways. For instance, it can be pumped and/or sucked through the inner tube 2, and for higher viscosity liquids an Archimedes screw can be used. Devices used for generating the movement, i.e. flow, through the inner tube 2, such as a motor, a shaft, a turbine, etc., are arranged outside of the outer tube.

According to an embodiment of the method of continuous in-situ determination of the heat production in a reactor containing a pumpable reaction medium, by means of the reaction calorimeter probe 1 described above, the method comprises:

determining a first absolute temperature by means of the first temperature sensor 7;
determining a second absolute temperature by means of the second temperature sensor 9;
determining a temperature difference between the first and second absolute temperatures;
determining the heat production by means of the temperature difference, the volume of the pumpable reaction medium in the inner tube between the first and second temperature sensors, and the heat capacity of the pumpable reaction medium.

More particularly, according to an embodiment of the method, the temperature T1(t) of the reaction medium is determined at a first time t, by means of the first temperature sensor 7, i.e. the first absolute temperature, and as T2(t+Δt) at a second time t+Δt, by means of the second temperature sensor 9, i.e. the second absolute temperature, where Δt is the time it takes for the reaction medium to move between the first temperature sensor 7 and the second temperature sensor 9. The heat production Preac is determined as:

$$Preac = C*V/\Delta t*(T2(t+\Delta t) - T1(t)) \quad \text{Eqn. 2}$$

where C is the heat capacity of the reaction medium at a constant volume, and V is the reaction volume between the first and second temperature sensors 7, 9. As mentioned above, the volume V is thermally isolated from the surroundings, except for the inlet flow and the outlet flow, which are thermally determined. Consequently, the energy difference between the inlet flow and the outlet flow is the reaction heat generated by the reaction medium in the volume V during the time Δt. Preac is the average power generated during the time Δt. The flow rate V/Δt is a physical constant, while Δt is a system critical parameter, which can vary due to different causes.

The determination of the time delay Δt is made by generating a very short heat pulse at, i.e. just before, the first temperature sensor 7, by means of the first pulse heater 12, thereby inducing a significant local temperature change in the reaction medium, and detecting the heat pulse at the second temperature sensor 9. As an alternative, the determination of the time delay Δt is performed continuously. Thus, repeatedly, as soon as the heat pulse has been detected at the second temperature sensor 9, another heat pulse is generated at the first temperature sensor 7.

According to another embodiment of the method, the time delay Δt is determined by detecting a temperature profile, i.e. a pattern of temperature fluctuations, at the inlet end 8, and detecting the same temperature profile at the outlet end 10 by means of pattern recognition. For instance, the temperature profile can consist of several maximum and minimum temperature values occurring with a varying frequency at the inlet end 8. At the outlet end 10 the amplitudes may have decreased while the frequency remains in large, which makes it detectable. This determination of the time delay is at least possible to use at laminar flow through the inner tube 2.

According to another embodiment of the method, it comprises simultaneously determining the first and second absolute temperatures T1, T2, and determining the difference between them. This is repeated several times over a predetermined time interval, and the consecutive series of determined temperature differences is integrated over the predetermined time interval. By simultaneously is meant not at exactly the same point of time but as close as possible taking into count the switching of the switch 22, and the time for performing the calculations for the absolute temperature of the first temperature sensor 7, which is here defined as simultaneously since the actual time difference is a negligible.

Furthermore, according to an embodiment of the method, it comprises determining the heat capacity C of the pumpable reaction medium. This determination comprises generating a predetermined flow rate of the pumpable reaction medium; and during a determination time period, constantly heating the pumpable reaction medium with a predetermined calibration heat between the first and second temperature sensors, which is performed by means of the calibration heater 14. More particularly, a constant Joulean heat Pcal, where Pcal>>Preac is generated in the calibration heater 14 at a known flow rate V/Δt. Alternatively, the heat capacity C is determined by integrating a pulse temperature profile at the first temperature sensor 7, during the determination of the delay time Δt. The heat pulse is generated with a known heat energy, and by integrating over the temperature profile that is generated by the pulse the heat capacity can be determined. This is advantageously performed in conjunction with the measurement of the delay time, using one and the same pulse for both measurements.

While the invention has been illustrated and described in detail in the drawings and foregoing description, such illustration and description are to be considered illustrative or exemplary and not restrictive.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

What is claimed is:

1. A reaction calorimeter probe arranged for calorimetric in-situ measurements in a pumpable reaction medium, comprising an inner tube arranged to have the pumpable reaction medium flowing through the inner tube, an outer tube extending coaxially of the inner tube at a radial distance from the inner tube, a sealed space between the inner tube and the outer tube, wherein the space is provided with a vacuum, a first temperature sensor arranged at an inlet end of the inner tube, a second temperature sensor arranged at an outlet end of the inner tube, at a distance from the first temperature sensor, wherein the first and second temperature sensors are arranged in the space and in contact with the outer surface of the inner tube for measuring an absolute temperature of the inner tube, wherein the first and second temperature sensors are arranged to enable determinations of absolute temperatures with a resolution which is better than 1 µK, and a calculation device connected with the first and second temperature sensors, which calculation device is arranged to determine a first absolute temperature by means of the first temperature sensor, a second absolute temperature by means of the second temperature sensor, and to determine a temperature difference between the first and second absolute temperatures, wherein the reaction calorimeter probe further comprises a first initiation thermometer arranged in the space and in contact with the outer surface of the inner tube adjacent to the first temperature sensor, and a second initiation thermometer arranged in the space and in contact with the outer surface of the inner tube adjacent to the second temperature sensor, wherein the first and second initiation thermometers are arranged to provide the respective first and second temperature sensors with initiation temperatures.

2. The reaction calorimeter probe according to claim 1, comprising a pulse heater arranged in the space and in contact with the outer surface of the inner tube and arranged at the inlet end, closer to the very end than the first temperature sensor.

3. The reaction calorimeter probe according to claim 1 comprising a calibration heater arranged in the space and in contact with the outer surface of the inner tube between the first and second temperature sensors.

4. The reaction calorimeter probe according to claim 1, wherein the calculation device comprises an amplifier, which is alternatingly connected with the first and the second temperature sensors, respectively.

5. The reaction calorimeter probe according to claim 1, wherein the pressure in the space is lower than $10^{-8}$ bar.

6. A method of continuous in-situ determination of the heat production in a reactor containing a pumpable reaction medium, by means of a reaction calorimeter probe according to claim 1, comprising:
provide the first and second temperature sensors with initiation temperatures by means of the first and second initiation thermometers;
determining a first absolute temperature by means of the first temperature sensor;
determining a second absolute temperature by means of the second temperature sensor;
determining a temperature difference between the first and second absolute temperatures;
determining the heat production by means of the temperature difference, the volume of the pumpable reaction medium in the inner tube between the first and second temperature sensors, and the heat capacity of the pumpable reaction medium.

7. The method according to claim 6, wherein the second absolute temperature is determined with a time delay relative to the determination of the first absolute temperature, where the time delay corresponds with the time it takes for the pumpable reaction medium to move from the first temperature sensor to the second temperature sensor.

8. The method according to claim 6, wherein the first and second absolute temperatures are determined simultaneously, and further comprising:
integrating a consecutive series of determined temperature differences over a predetermined time interval.

9. The method according to claim 6, further comprising:
performing a time delay determination by generating a heat pulse at the first temperature sensor, thereby inducing a significant local temperature change in the pumpable reaction medium; and
detecting the heat pulse at the second absolute temperature sensor.

10. The method according to claim 6, further comprising:
performing a time delay determination by detecting a temperature profile at the inlet end; and
detecting the same temperature profile at the outlet end by means of pattern recognition, and determining the time delay as the time between the temperature profile detections.

11. The method according to claim 6, further comprising determining the heat capacity of the pumpable reaction medium, comprising:
generating a predetermined flow rate of the pumpable reaction medium; and
during a determination time period constantly heating the pumpable reaction medium with a predetermined calibration heat between the first and second temperature sensors.

12. The method according to claim 6, further comprising determining the heat capacity of the pumpable reaction medium, comprising:
generating a heat pulse at the first temperature sensor; and
integrating over the temperature profile that is generated by the pulse.

* * * * *